United States Patent
Daud et al.

(10) Patent No.: US 9,400,607 B1
(45) Date of Patent: Jul. 26, 2016

(54) STATELESS PROCESSING OF REPLICATED STATE FOR DISTRIBUTED STORAGE SYSTEMS

(71) Applicant: Igneous Systems, Inc., Seattle, WA (US)

(72) Inventors: Asif Arif Daud, Seattle, WA (US); Andrew Martin Pilloud, Seattle, WA (US); Eric Michael Lemar, Seattle, WA (US); Triantaphyllos Byron Rakitzis, Seattle, WA (US)

(73) Assignee: Igneous Systems, Inc., Seattle, WA (US)

( * ) Notice: Subject to any disclaimer, the term of this patent is extended or adjusted under 35 U.S.C. 154(b) by 0 days.

(21) Appl. No.: 14/811,573

(22) Filed: Jul. 28, 2015

(51) Int. Cl.
*G06F 12/00* (2006.01)
*G06F 3/06* (2006.01)

(52) U.S. Cl.
CPC .............. *G06F 3/0619* (2013.01); *G06F 3/065* (2013.01); *G06F 3/0665* (2013.01); *G06F 3/0689* (2013.01)

(58) Field of Classification Search
CPC ..... G06F 3/0619; G06F 3/0665; G06F 3/065; G06F 3/0689
See application file for complete search history.

(56) References Cited

U.S. PATENT DOCUMENTS

| | | | | |
|---|---|---|---|---|
| 7,979,652 B1* | 7/2011 | Sivasubramanian | | G06F 11/2094 711/141 |
| 8,793,343 B1* | 7/2014 | Sorenson, III | .... | G06F 17/30203 709/219 |
| 2008/0040402 A1* | 2/2008 | Judd | ................... | G06F 11/2066 |
| 2008/0046644 A1* | 2/2008 | De Spiegeleer | ..... | G06F 11/1076 711/104 |
| 2012/0059934 A1* | 3/2012 | Rafiq | .................. | H04L 67/1008 709/225 |

* cited by examiner

*Primary Examiner* — Larry Mackall
(74) *Attorney, Agent, or Firm* — John W. Branch; Lowe Graham Jones PLLC

(57) ABSTRACT

Embodiments are directed towards storing data in a storage system. A data controller may obtain a write request and write data from a client computer. A write message may be generated and provided to a data coordinator computer. The data coordinator may communicate the write message to a plurality of L-node computers. The data coordinator may obtain write confirmation messages from the L-node computers that indicate that the write data is stored. If enough write confirmation messages are obtained to indicate that a quorum is reached, the data coordinator may communicate a save confirmation message to the data controller. The data controller may generate a write acknowledgement message based on the save confirmation message provided by the data coordinator. The data controller may provide the write acknowledgement message to the client computer that made the original write request.

30 Claims, 11 Drawing Sheets

STATELESS PROCESSING OF REPLICATED STATE FOR DISTRIBUTED STORAGE SYSTEMS

TECHNICAL FIELD

This invention relates generally to managing data storage in a network, and more particularly, but not exclusively, to managing and controlling data replication in a data storage system.

BACKGROUND

The amount of data generated and retained by modern enterprises continues to increase. This explosion in data has led to larger and larger data storage systems. In some cases, these data storage systems may include thousands of storage devices. Unfortunately, as number of storage devices in a storage system increases the probability of storage device failure within a storage system increases as well. Accordingly, storage systems may be arranged to use various error recovery and/or replication schemes to defend against storage device failure. For example, data storage systems may be arranged to employ error/data recovery techniques, such as, erasure coding and/or replication for reducing the risk of data loss. However, as the size and scale of the storage systems increase, it may become prohibitively expensive it terms of both storage and performance to mitigate the risk of data loss. Also, in some cases, information may be replicated across many storage computers maintaining a consistent version/view of the information may be difficult in distributed environment. Thus, it is with respect to these considerations and others that the invention has been made.

DETAILED DESCRIPTION OF THE EMBODIMENTS

Figure 1:
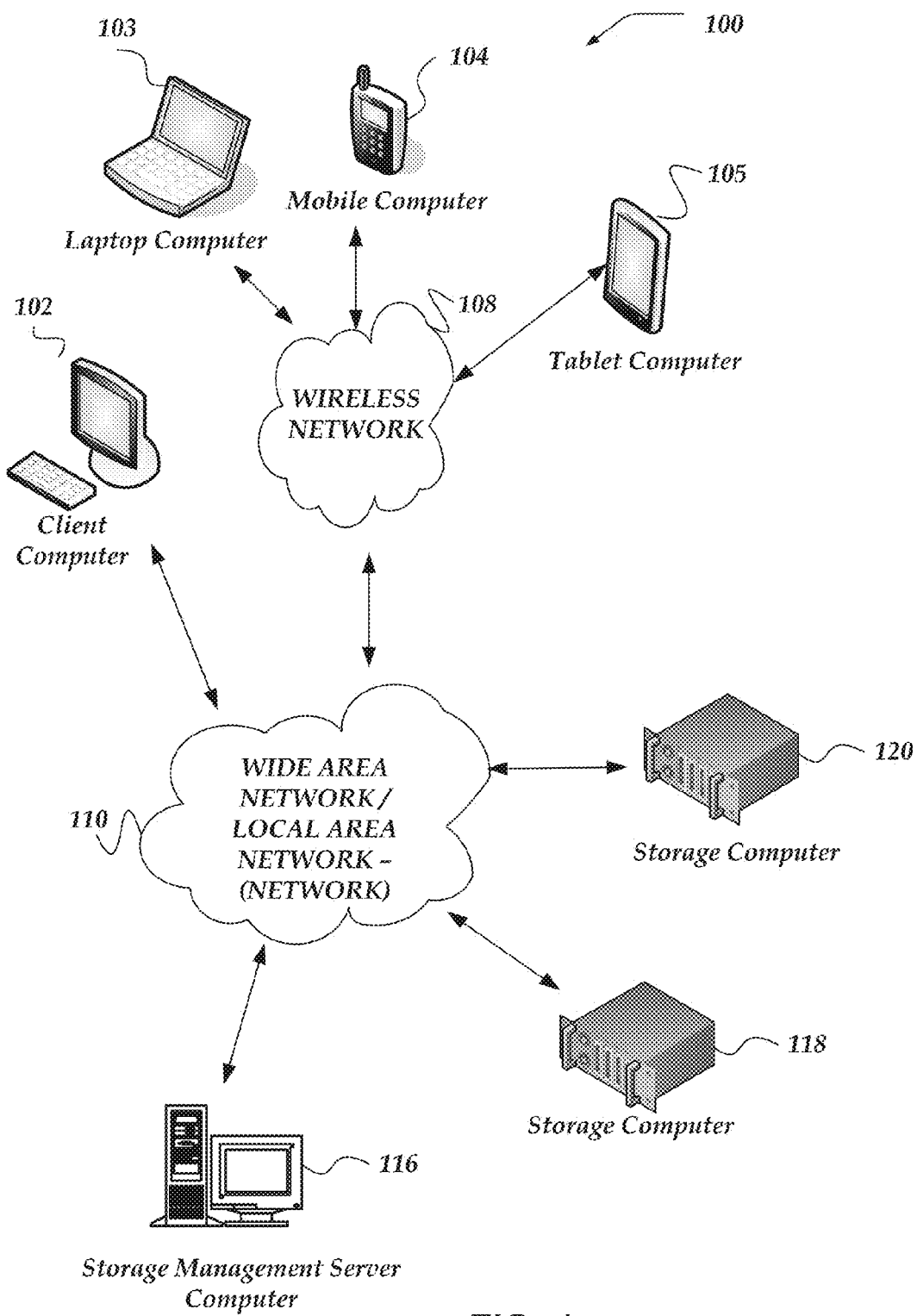
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "storage device" as used herein refers to various apparatus for storing digital information, generally for use by computers. Storage devices may be fixed or removable nonvolatile memory systems, such as, magnetic hard drives, magnetic tape, optical drives, solid state drives (SSD), flash memory storage, or the like. Typically, one or more storage devices may be arranged to store information for use in a computer system.

The term "storage computer" as used herein refers to a computer that is arranged to include one or more storage devices. In at least one of the various embodiments, a storage computer may include several storage devices inside a chassis. In other embodiments, the storage devices may be integrated with the storage computer.

The term "storage unit," or "storage block" as used herein refers to portions of the storage system that are dedicated to storing source data or source symbols. Storing data in a storage unit does not imply a particular data format (e.g., compressed v. non-compressed, encrypted v. unencrypted). Data located in a storage unit may be used as source symbols for erasure coding based data protection.

The term "repair symbol unit," or "repair symbol block" as used herein refers to portions of the storage system that are dedicated to storing encoding symbols generated for erasure coding data protection. Accordingly, the data stored on repair symbol units is generated from source symbols that are stored on storage units or storage blocks.

The term "CPU complex" as used herein refers to portion of a computer that generally includes, one or more CPU's, cache memory, RAM, I/O components, or the like. Herein, having one or more CPU complexes at least distinguishes a storage computer from a storage device.

The term "protection level" as used herein refers to the number of simultaneous data failures a storage system may experience before data may be irrevocably lost. In at least one of the various embodiments, protection level may be computed based on the amount of repair symbol information the storage system is storing for each storage unit. For example, if a storage system that employs erasure coding has ten hard drives for data storage and two hard drives for storing repair symbol information, under most arrangements the storage system would be considered to have a protection level of two.

The term "erasure coding" as used herein refers to methods for error correction/error recovery based on computing repair symbol information from storage information. The repair symbol information may be computed and stored separately from the storage information and may be employed to correct errors in the storage information that may be caused by data failure. Likewise, if the repair symbol information is lost because of a storage failure, it may be recomputed from the storage information. One of ordinary skill in the art will be familiar with one or more well-known techniques for implementing erasure coding in a computer storage system. One or more well-known erasure coding algorithms may be employed for generating repair symbol information and recovery from data failure, such as, Reed-Solomon coding, XORing, Hamming codes, or the like. Various standard, non-standard, or custom, erasure coding systems may be used, non-limiting examples include, RAID 5 or RAID 6, or the like.

The terms "data failure," or "storage failure" as used herein refer to any system or device failure that causes data stored in a storage computer to be corrupted, lost, involuntarily deleted, or otherwise damaged such that the data is unreadable or involuntarily modified. For example, if a storage system includes ten storage devices, the physical failure (breakdown) of one or more of the storage devices may be classified as a storage failure or data failure, since the information stored on the failed storage device may be inaccessible.

As used herein the term "P-node" refers to a computer in a distributed storage system that is arranged to communicate with clients of the storage system. P-nodes may be network computers that may communicate over a network to one or more clients. P-nodes may be separate from the persistence/stable storage of the storage system. Accordingly, P-nodes may be associated with one or more L-nodes that provide persistence/stable data storage. A P-node may be selected/elected to be a data controller for the storage system.

As used herein the term "L-node" refers to a computer in a distributed storage system that is arranged to provide persistent and stable data storage for a storage system. L-nodes may be arranged into one or more consensus groups that enable consensus algorithms to be employed if data is being stores/written. L-nodes store data independent of the application often in the form of journal records that record of historical record of data writes and/or modifications. L-nodes may be arranged and/or optimized for storing, persisting, and retrieving data in the form of journal records. The L-nodes may be unaware of the application context of the data payload information that may be associated with a given journal record.

Note, the terms L-node and P-nodes are used herein to provide clarity when describing and distinguishing between the duties and roles of L-node computers and the P-node computers.

As used herein the term "journal records" refers to stored data records that preserve the record of changes made to data. Accordingly, journal records associated with a particular data object may be replayed to generate a version of the data. For example, the current value of a particular data value may be generated by "replaying" the complete set of journal records associated with the particular data value.

As used herein the term "data controller" refers to a P-node computer that has been determined to be the P-node that may be used for communicating with the L-node portion of a storage system.

As used herein the term "data coordinator" refers to an L-node computer that has been determined perform supervision of one or more L-nodes that may be part of a consensus group. In at least one of the various embodiments, the data coordinator manages read and write requests that may be communicated from a data controller (a P-node computer). If a data coordinator goes offline, another L-node may be elected or otherwise determined to be become the next data coordinator.

Briefly stated, various embodiments are directed towards storing data in a storage system. In at least one of the various embodiments, a data controller computer may obtain a write request and write data from a client computer.

In at least one of the various embodiments, a write message that includes at least the write data may be generated by the data controller computer. In at least one of the various embodiments, the data controller computer may generate one or more journal records based on the write request and the write data that are included in the write message.

In at least one of the various embodiments, the data controller computer may be a P-node computer that has been elected from a plurality of L-node computers. Further, in at least one of the various embodiments, each P-node computer may be arranged to include at least a local cache memory that stores the write data and omits a persistent data store.

In at least one of the various embodiments, the data controller computer may provide the write message to a data coordinator computer. In at least one of the various embodiments, the data coordinator computer may communicate the write message to a plurality of L-node computers that may be associated with the data coordinator computer.

In at least one of the various embodiments, the data coordinator computer may obtain one or more write confirmation messages from one or more L-node computers of the plurality of L-node computers that may indicate that the write data may be stored by the one or more L-node computers.

In at least one of the various embodiments, each of the plurality of L-node computers may include a persistent, fault tolerant data store.

In at least one of the various embodiments, if enough write confirmation messages are obtained to indicate that a quorum is reached, the data coordinator computer may communicate a save confirmation message to the data controller computer that provided the write message. In at least one of the various embodiments, a quorum may be determined based on at least an execution of a consensus algorithm by the data coordinator computer and the plurality of L-node computers.

In at least one of the various embodiments, the data controller computer may generate a write acknowledgement message that may be compatible with the write request based on the save confirmation message provided by the data coordinator computer and the write request provided by the client computer.

In at least one of the various embodiments, the data controller computer may provide the write acknowledgement message to the client computer that made the original write request.

In at least one of the various embodiments, the client computer may provide the write request and the write data to the P-node computer that is separate from the data controller computer.

In at least one of the various embodiments, the data controller computer may obtain the write request and write data from a P-node computer that is separate from the data controller computer.

In at least one of the various embodiments, the data controller computer may obtain one or more read requests from the client computer. In at least one of the various embodiments, if a data value corresponding to the read request may be unavailable from a local cache of the data controller computer, the read request may be provided to the data coordinator computer to obtain one or more journal records associated with the data value. Accordingly in at least one of the various embodiments, the data controller computer may generate a read response based on the one or more journal records.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Storage Management Server Computer 116, Storage Computer 118, Storage Computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, storage management server computer 116, storage computer 118, storage computer 120, or other computers.

Client computers 102-105 may further be configured to include a client application that enables an end-user to log into an end-user account that may be managed by another computer, such as storage management server computer 116, storage computer 118, storage computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, storage management server computer 116, storage computer 118, storage computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of storage management server computer 116 is described in more detail below in conjunction with FIG. 3. Briefly, however, storage management server computer 116 includes virtually any network computer capable of managing data storage in network environment for one or more applications or services.

Although FIG. 1 illustrates storage management server computer 116, storage computer 118, storage computer 120 each as a single computer, the innovations and/or embodiments are not so limited. For example, one or more functions of storage management server computer 116, storage computer 118, storage computer 120, or the like, may be distributed across one or more distinct network computers. Moreover, storage management server computer 116, storage computer 118, storage computer 120 are not limited to a particular configuration such as the one shown in FIG. 1. Thus, in one embodiment, storage management server computer 116, storage computer 118, or storage computer 120 may be implemented using a plurality of network computers. In other embodiments, server computer may operate as a plurality of network computers within a cluster architecture, a peer-to-peer architecture, or the like. Further, in at least one of the various embodiments, storage management server computer 116, storage computer 118, or storage computer 120 may be implemented using one or more cloud instances in one or more cloud networks.

Also, in at least one of the various embodiments, one or more storage management server computers, or at least some or all of the features thereof, may be incorporated in a storage computer, such as, storage computer 118, or storage computer 120. Accordingly, these innovations and embodiments are not to be construed as being limited to a single environment, and other configurations, and architectures are also envisaged.

In at least one of the various embodiments, storage management server computer 116 may represent one or more P-nodes, including a P-node that may be elected to be a data controller. Likewise, in at least one of the various embodiments, storage computer 118 and storage computer 120 may represent L-nodes, including an L-node that may be elected to be a data coordinator.

Illustrative Client Computer

Figure 2:
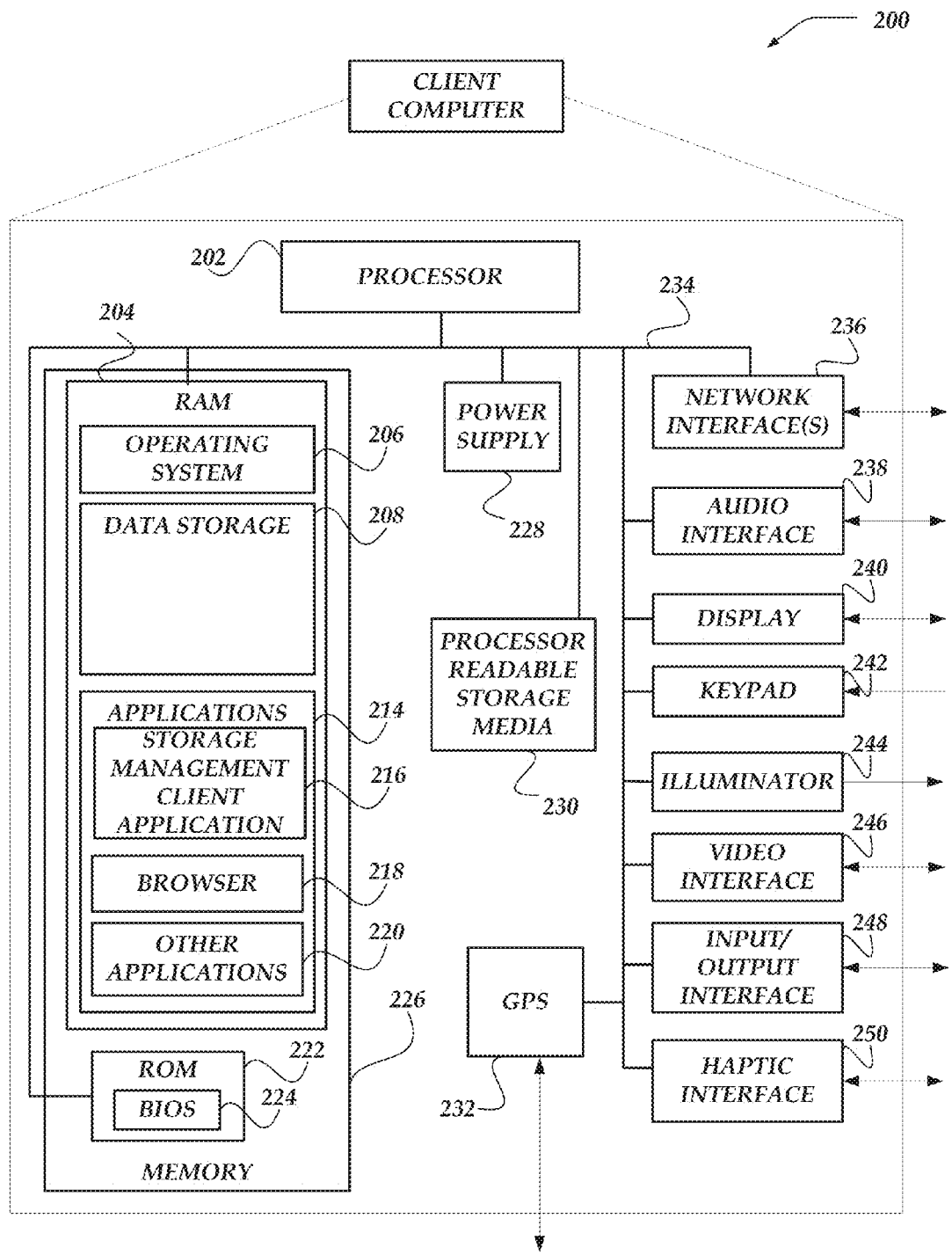
FIG. 2 shows a logical schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220. Further, applications 214 may include storage management client application 216 for integrating one or more file systems with a storage system and/or integrating with a storage management application, or the like.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as storage management server computer 116, storage computer 118, and/or storage computer 120 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
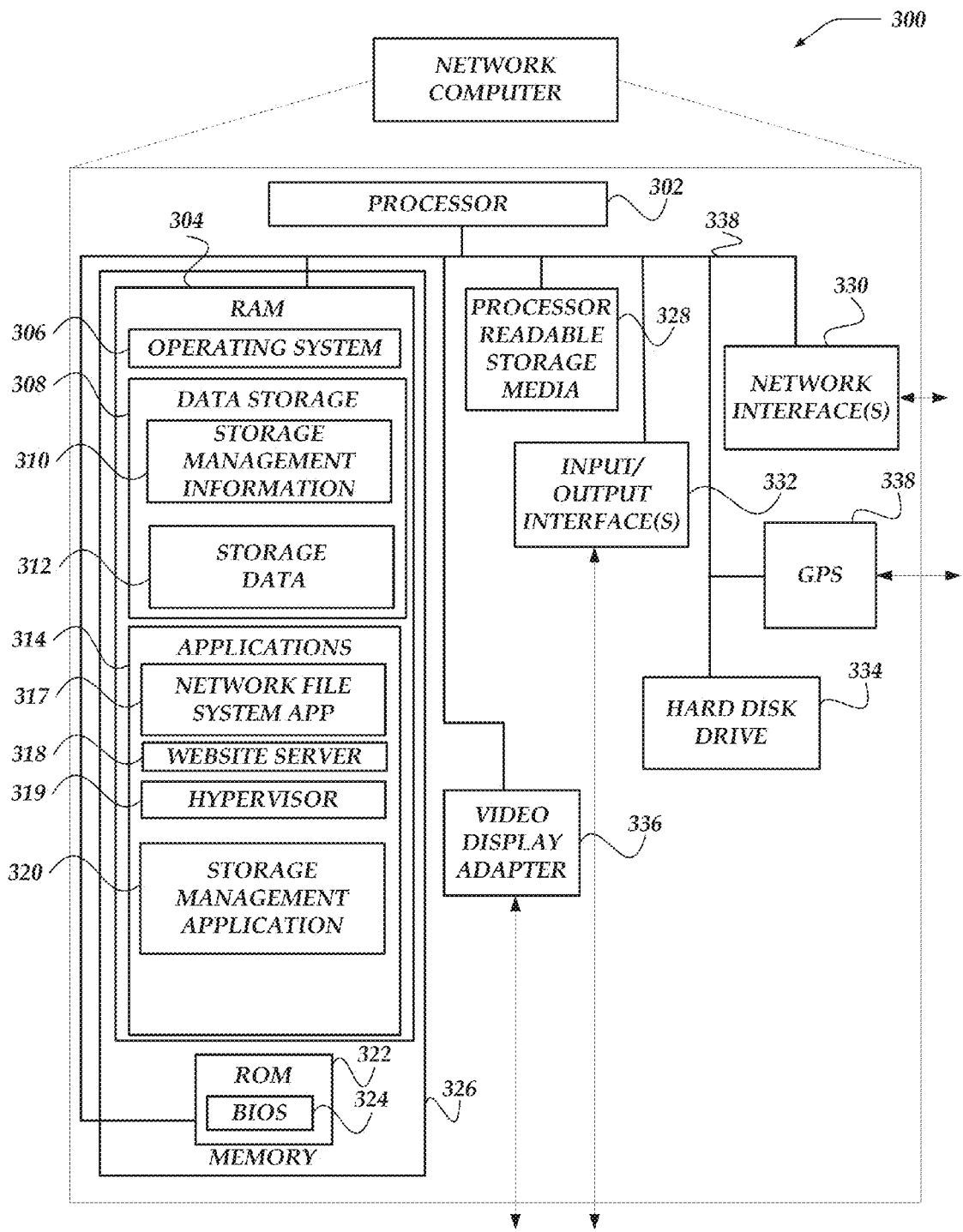
FIG. 3 illustrates a logical schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example storage management server computer 116, and/or other network computers, such as, computers comprising, storage computer 118, or storage computer 120.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units. In at least one of the various embodiments, network computer 300 may include global positioning system (GPS) receiver 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Network computer 300 may also include GPS transceiver 338 to determine the physical coordinates of network computer 300 on the surface of the Earth. GPS transceiver 338, in some embodiments, may be optional. GPS transceiver 338 typically outputs a location as latitude and longitude values. However, GPS transceiver 338 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 338 can determine a physical location within millimeters for network computer 300; and in other cases, the determined physical location may be less precise, such as within a meter or significantly greater distances. In one embodiment, however, network computer 300 may through other components, provide other information that may be employed to determine a physical location of the computer, including for example, a Media Access Control (MAC) address, IP address, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Further, in at least one of the various embodiments, a network computer arranged as a storage computer, such as, storage computer 118 or storage computer 120, may include one or more hard drives, optical drives, solid state storage drives or the like, for storing the data stored by a storage system.

Data storage 308 may include storage management information 310. In at least one of the various embodiments, storage management information 310 may include information, such as, storage computer/device status, repair task lists, capacity information, user profiles, or the like. Also, in at least one of the various embodiments, data storage 308 may include storage data 312 representing actual data that may be stored on a storage device and/or a storage computer.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, network file system application 317, website server 318, hypervisor 319, storage management application 320, distributed task management application 321, or the like.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

In at least one of the various embodiments, network computer 300 may be employed as one or more P-nodes, including a P-node that may be elected to be a data controller. Likewise, in at least one of the various embodiments, network computer 300 may be employed as L-nodes, including an L-node that may be elected to be a data coordinator.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical Architecture

In at least one of the various embodiments, in a data storage system. In at least one of the various embodiments, storage computers, storage devices, or the like, may be organized into different arrangements not limited to those described below depending on the specific storage requirements of the applications and/or services that may be using the storage systems.

Figure 4:
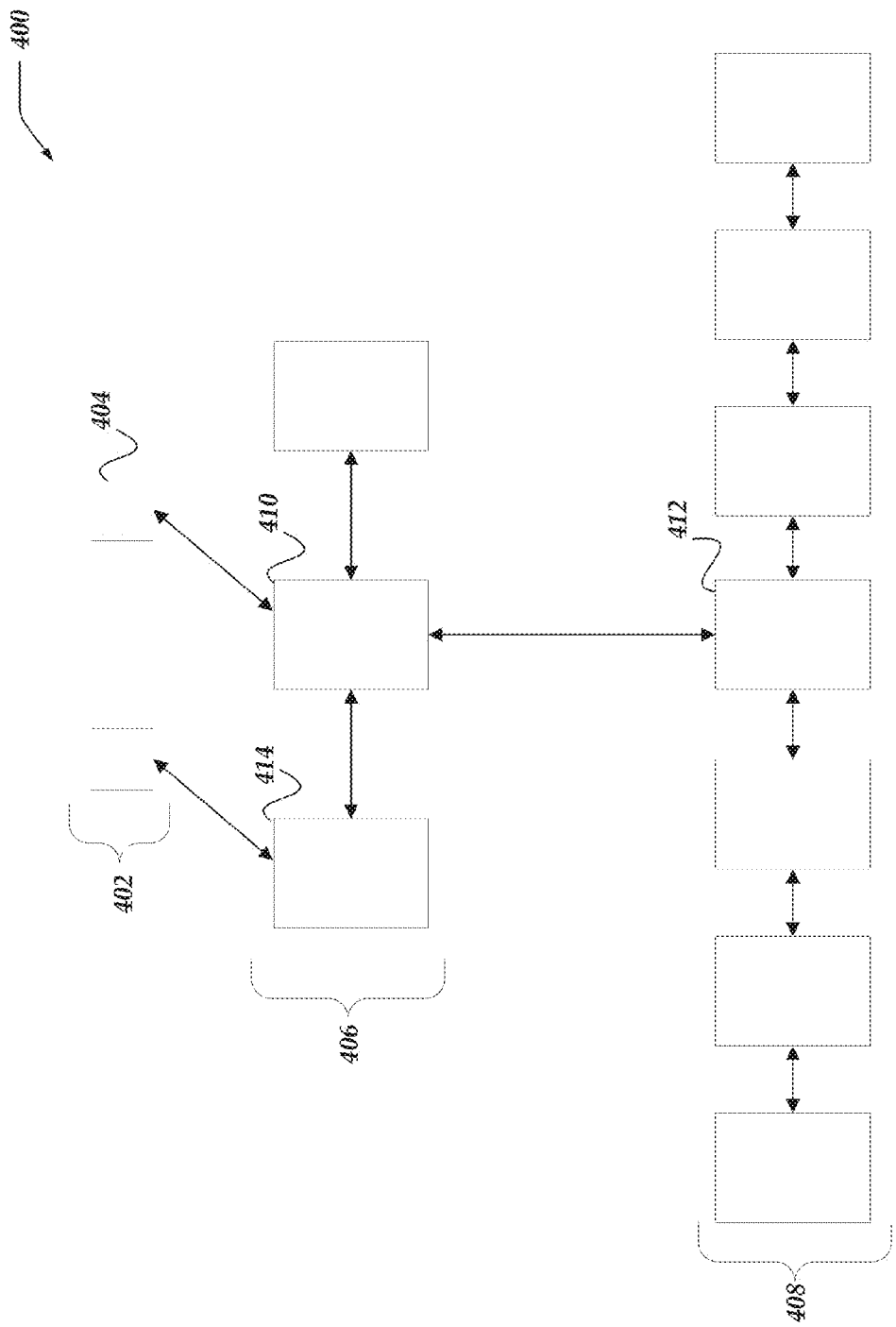
FIG. 4 illustrates a logical architecture for a storage system for stateless processing of replicated state for distributed storage systems, in accordance with at least one of the various embodiments.

FIG. 4 illustrates a logical architecture for storage system 400 for stateless processing of replicated state for distributed storage systems, in accordance with at least one of the various embodiments. In at least one of the various embodiments, clients of storage system 400, such as client computer 402 and client computer 404 may be coupled to storage system 400 using a network, such as, as network 110 or network 108. In at least one of the various embodiments, client computers may be a computer, such as, client computer 200 and/or network computer 300 that may be arranged to access information stored on storage system 400. In some cases, client computers may be computers that are part of the storage system 400 or another storage system. Generally, client computer 402 and client computer 404 logically represent software and/or hardware clients that may be accessing data stored on storage system 400.

In at least one of the various embodiments, P-nodes 406 represent a set of P-nodes that comprise storage system 400. In at least one of the various embodiments, p-nodes may be network computers, such as, as network computer 300, that may be arranged to process requests from clients of storage system 400 (e.g., in this non-limiting example these may be requests from client 402 and/or client 404).

In at least one of the various embodiments, the number of P-nodes in a storage system may vary depending on performance and/or availability requirements of a storage system. In this example, for brevity and clarity three P-nodes are illustrated. However, one of ordinary skill in the art will appreciate the scope of the innovation herein contemplate that there may be more or fewer p-nodes.

In at least one of the various embodiments, P-nodes may be arranged to support one or more information access protocols, including custom messaging APIs, standards based file system APIs, network protocols, or the like, or combination thereof. Information communication protocols, techniques, interfaces, or the like, that enable client 402 and/or client 404 to communicate over network with p-nodes 406 may be employed by one or more the various embodiments.

In at least one of the various embodiments, storage system 400 may be arranged include L-nodes 408. In at least one of the various embodiments, L-nodes may be network computers that are arranged provide stable storage for information stored in the storage system. In at least one of the various embodiments, L-nodes, such as, L-nodes 408 may be arranged such that they may be unavailable for direct access by clients, such as, client 402.

In at least one of the various embodiments, P-nodes, such as, P-nodes 406 may be arranged to communicate with clients of the storage system, such as, client 402 and client 404. Further, in at least one of the various embodiments, one of the P-nodes, such as, as P-node 410 may be arranged to be a data controller.

In at least one of the various embodiments, a data controller, such data controller 410 may be arranged to communicate directly with one or more of the L-nodes. In at least one of the various embodiments, the data controller for a group of P-nodes may be determined based on configuration information. In other embodiments, a data controller may be determined dynamically based on an election process that may be executed by the P-nodes or the L-nodes. For example, in at least one of the various embodiments, a plurality of L-node computers may be configured to elect one of the P-nodes to be the data controller. Likewise, in some embodiments, P-nodes may be arranged to elect the data controller.

In at least one of the various embodiments, data controller 410 may be arranged to communicate to one or more L-nodes that may be performing the role of data coordinator, such as data coordinator 412. In at least one of the various embodiments, a data coordinator, such as data coordinator 412 may be arranged to coordinate service requests communicated to and from a data controller, such as data controller 410. In at least one of the various embodiments, the selection of which L-node is the data coordinator may be based on configuration information and/or an election process that may be performed by the L-nodes.

In at least one of the various embodiments, data controller 410 may be arranged to communicate reads and writes to L-nodes by way of data coordinator 410. In at least one of the various embodiments, data controller 410 may be arranged to cache data locally to respond a read requests. If the data stored at a P-node receiving a read request is not current, the data controller may request information from the L-nodes to generate a current version of the data to respond to the request and store in the cache.

In at least one of the various embodiments, requests made by clients, such as, client 402 and/or client 404 may be provided to one or more of the P-nodes. In at least one of the various embodiments, if the request is received by a P-node that is not the current data controller, such as, P-node 414, the P-node that received the request may forward it to the P-node that is the current data controller, such as, data controller/P-node 410.

In at least one of the various embodiments, if a request is received from a client, or forwarded by another P-node, the P-node performing as the data controller may process the request. In at least one of the various embodiments, if the request may be resolved using the local cache of the data controller, the response may be formulated and provided to the requestor (e.g., either to a client or to a forwarding P-node without obtaining data from the L-nodes.

In at least one of the various embodiments, P-nodes other than the data controller may also be arranged to include a local cache for responding to read requests. Accordingly, in at least one of the various embodiments, if a P-node that is not the current data controller is provided a request that may be resolved using its local cache, it may formulate a response and communicate it to the requestor without communicating with the data controller or the L-nodes.

In at least one of the various embodiments, one or more L-nodes, such as, L-nodes 408 may be arranged into a consensus group. Accordingly, they may employ one or more consensus algorithms to as part of the data storage process. In at least one of the various embodiments, a consensus group algorithm may be employed to determine if/when a requested write operation may be considered stored to persistent storage. In at least one of the various embodiments, a data coordinator, such as, data coordinator 412 may be arranged to coordinate one or more consensus algorithms that may be employed by the storage system.

One of ordinary skill the art will be familiar with the operation of consensus algorithms in the storage systems domain. However, a brief discussion is presented here for context and clarity. Distributed consensus algorithms are designed to enable consistent entries in a clustered/distributed storage system. Nodes in clusters that participate in the consensus algorithm may be called a consensus group (e.g., L-nodes 408). One node in the consensus group may be elected its leader (e.g., data coordinator 412). The election process may be designed to be fault tolerant, such that it automatically elects a new leader if there is not a current leader. For example, upon initialization of the system, or if the current leader go offline for some reason. Distributed consensus algorithms may define one or more election mechanisms/protocols that enable the consensus group members to maintain an elected leader at all times.

In at least one of the various embodiments, if a consensus group is provided a write request, the request, it will first be provided to the consensus group leader, in the present example, this is data coordinator 412. In at least one of the various embodiments, the consensus leader will forward the request to the other members of the consensus group. When a quorum of group members have acknowledged the write request, the leader may respond to the client, acknowledging that the write has been persistently stored. Meanwhile, the remainder of the consensus group members may complete the write.

In at least one of the various embodiments, consensus groups may have a defined threshold value of acknowledgments to determine if a quorum has been reached. Accordingly, if a quorum is reached, the consensus coordinator (e.g., data coordinator 412) may provide an acknowledgment to the client indicating that the write is successful. In some embodiments, the quorum may be majority of the consensus group members. In other embodiments, it may be more than a majority. The specific number of acknowledgements to obtain a quorum may vary depending on the particular consensus algorithm that is being used and/or configuration information.

In at least one of the various embodiments, in storage system 400, L-nodes 408 may be arranged into a consensus group with data coordinator 412 performing as the group's elected consensus coordinator/leader. Accordingly, in at least one of the various embodiments, if data controller 410 provides data for a write, it may be provided to data coordinator 412. If the data for writing reaches data coordinator 412, it will initiate the process of distributing the write data to the other L-nodes. If a number of L-nodes acknowledging the write request meets or exceeds a defined threshold value (e.g., a quorum value), data coordinator 412 may respond to data controller 410 indicating that the write is successful.

In at least one of the various embodiments, the contents of the data provided by data controller 410 to data coordinator 412 may be opaque to data coordinator 412 and the other L-nodes. Accordingly, the L-nodes may store the data absent knowledge or visibility of the content and/or context of the data. Likewise, if responding to a read request, the content and/or context of the data is similarly unknown to the L-nodes.

For example, in at least one of the various embodiments, a client, such as, client 404 may generate a request to read a particular configuration value and communicate it data controller 410. In this example, data controller 410 may interpret the request and determine that its local copy of the data does not include the latest value. Accordingly, in this example, data controller 410 may send a request to data coordinator 412 to retrieve some or all of the information to build and/or rebuild a local cache.

In at least one of the various embodiments, the storage system may be arranged such that each modification to the data is recorded a record or journal entry. Accordingly, the L-nodes may be arranged to persistent each modification/update record that corresponds to data stored in the system.

In at least one of the various embodiments, the P-nodes may be arranged to reconstitute a current view/version of the data by replaying the journal records that are stored on the L-nodes. Accordingly, if a data controller P-node does not have a current version of the data stored in its local memory/cache it may request the journal records from the L-node data coordinator to enable it generate the current version of the data.

In at least one of the various embodiments, the P-nodes may be unable to request a current version of the data directly from the L-nodes, because the L-nodes have stored the journal records corresponding to the data changes rather than the current version of the data.

In at least one of the various embodiments, if the L-nodes provide the journal records to the P-nodes, usually to a P-node performing as a data controller, such as, data controller/P-node 410, the P-nodes may generate a current version of the data by replaying the journal records provided by the L-nodes. After, the journal records are replayed by the P-node, the P-node will have a current version of the data. In at least one of the various embodiments, the data controller P-node may be arranged to generate the current version of the data by replaying the journal records provided by the data coordinator L-node.

For example, in at least one of the various embodiments, storage system 400 may be arranged to store key-value information. Accordingly, in this example, each update to a value corresponding to a given key, such as, "User_Storage_Quota" may be stored on the L-nodes in the form a journal entry. For example, if a client sets the User_Storage_Quota to 500 MB, a journal record reflecting the change may be stored on the L-nodes. In some cases, the journal record may represent the delta, such as, "User_Storage_Quota"="+500", or it may be interpreted as the actual value, such as, User_Storage_Quota="500".

Continuing with this example, each modification to User_Storage_Quota, as well as, other key-value pairs may be stored on the L-nodes as journal entries that record the relevant change. As such, the information for generating a current version of the data may be included in the journal records that are stored in persistent storage of the L-nodes.

Accordingly, in at least one of the various embodiments, if data controller requests a current version of the data, such as, one or more key values, it may request the necessary journal records from the data coordinator. Thus, if the data controller is being initialized it may request all of the journal records for the requested data. And from those journal records, generate a current version of the data. In other cases, the data controller may just request the journal records that may have been entered after a certain time. In such cases, the data controller may retrieve the minimum number of journal records to bring a cached value up to date. For example, a data controller may request journal records from a particular time (e.g., one hour ago) until the current time.

In at least one of the various embodiments, the current version of the data may be cached in volatile memory one or more of the P-nodes, including at least the data controller. Note, while herein the P-nodes are described as caching the current version of the date in volatile memory, this implies the data is volatile in the sense that it is may not be protected to the same level as the L-nodes using erasure coding, or other data protection mechanisms. Accordingly, the cache memory on P-nodes may be comprised of DRAM, SDRAM, SSDs, hard drives, or the like, or combination thereof.

In at least one of the various embodiments, storage system 400 fault tolerance and/or data protection may be provided by the L-nodes. Accordingly, in at least one of the various embodiments, storage system 400 may be arranged to employ protections methods, such as, erasure coding, or the like, to provide fault tolerance at the L-nodes rather than the P-nodes.

In at least one of the various embodiments, if a data controller goes offline, another P-node may be elected to become the data controller. If this happens, the new data controller may request the journal records from the data coordinator to use for generating a current version of the data.

In at least one of the various embodiments, even though in this example (storage system 400), three P-nodes are included in P-nodes 406, just one P-node is required—it would perform as the data controller P-node. Accordingly, in at least one of the various embodiments, if P-node 410 and P-node 414 went offline, the remaining P-node would perform as the data controller.

In at least one of the various embodiments, the L-nodes may have one or more levels of protection that enable one or more failures for each level of protection. The particular arrangement of the protection levels and number required storage computers for the L-nodes may depend on the particular type of protection scheme being employed in a storage system.

In at least one of the various embodiments, if a client provides a read request to a data controller, the data controller may determine that its cached copy of the data may be out of date. Such as determination may be made based on one or more considerations, such as, the expiry of a timeout, communication with the data coordinator, inability to find data responsive to a read request in the cached data, or the like, or combination thereof. Accordingly, the data controller may request that the data coordinator provide the journal records needed to update the current cache.

In at least one of the various embodiments, each journal record may include an identifier, such as an index/count number, timestamp, or the like, or combination thereof, to enable the identification of individual journal records and/or ranges of journal records.

In at least one of the various embodiments, the data controller may maintain a record of the last journal entry used for generating the current version of the data. For example, if journal records 1-1000 were last used to generate the version of the data located on the data controller, the data controller may request all journal records starting with record 1001 and beyond. Thus, the data coordinator may gather those journal records and provide them to the data controller. Next, the data controller may replay those journal records to update its copy of the data and make it current. Also, in some embodiments, a data controller may request journal records using timestamps, time ranges, or the like. For example, a data controller may request journal records old than a particular time, timestamp, or the like.

In at least one of the various embodiments, requesting journal records using identifiers may enable the data controller reduce network traffic and computation time by limiting the journal records to just those that are new relative to the version of the of data stored by the data controller.

In at least one of the various embodiments, storage system 400 has been described in terms of P-nodes and L-nodes. This nomenclature is used to clarify the different roles performed in the storage system. Accordingly, various physical or virtual computers, such as network computer 300 may be arranged to act as P-nodes in a storage system. Likewise, various physical or virtual computers, such as network computer 300 may be arranged to act as L-nodes in a storage system.

Further, in at least one of the various embodiments, a data controller P-node may be arranged to perform the functions of a data coordinator. In these types of embodiments, the L-nodes may communicate with a P-node that is acting as the data coordinator rather that an elected L-node. In some embodiments, a P-node may be configured to simultaneously act as the data controller and the data coordinator for a file system.

Figure 5:
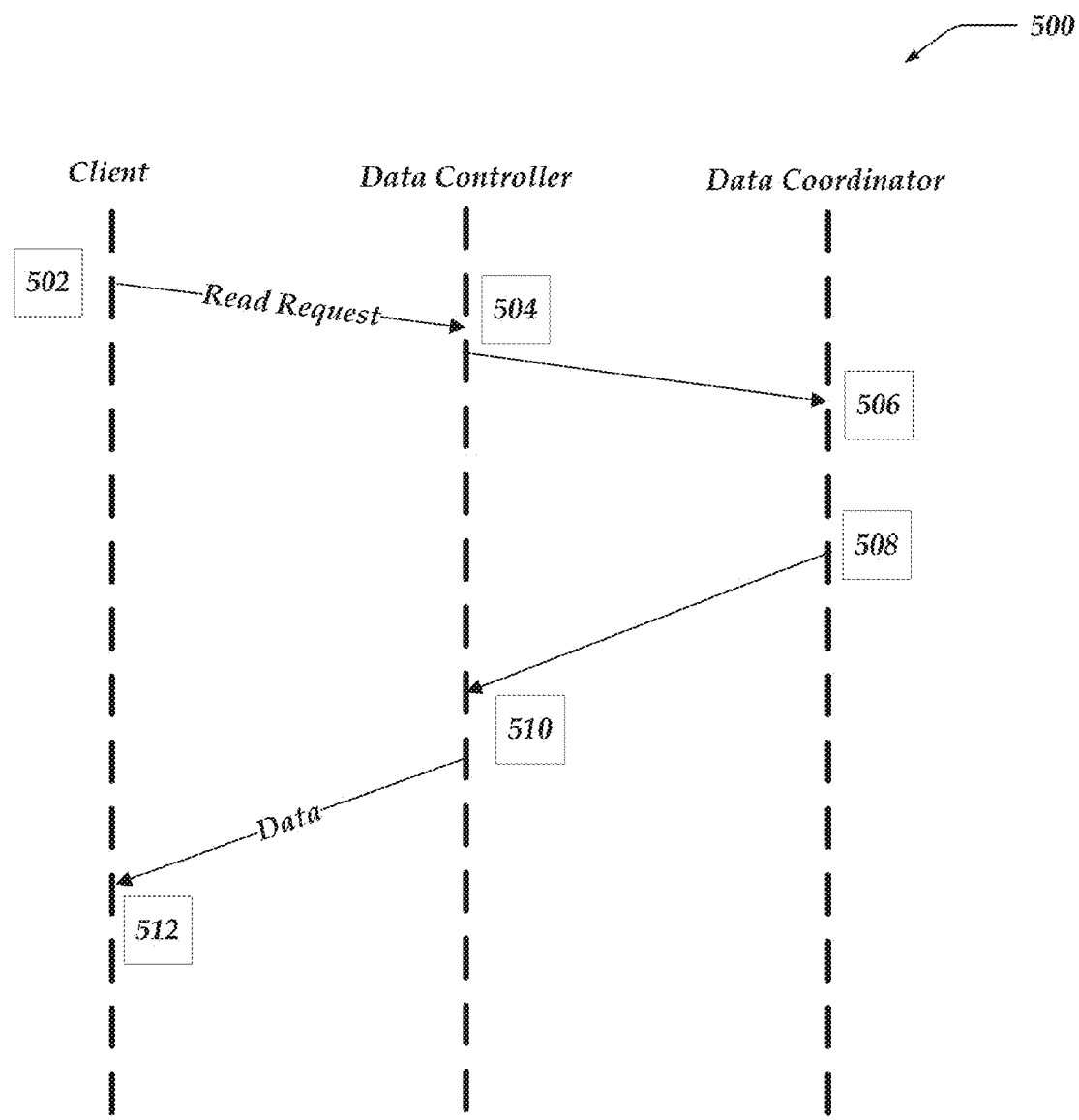
FIG. 5 illustrates an overview sequence diagram of a process for handling a read request from a client, in accordance with at least one of the various embodiments.

FIG. 5 illustrates an overview sequence diagram of process 500 for handling a read request from a client, in accordance with at least one of the various embodiments. At step 502, in at least one of the various embodiments, a client may request to read data from a storage system, such as, storage system 400 in FIG. 400. At step 504, in at least one of the various embodiments, the data controller may receive the request and determine if it can resolve the request using its local cache. Note, in this example, it may be assumed the data controller may be unable to resolve the request from its local cache. Accordingly, the data controller may make a request for one or more journal records and communicate it to the data coordinator.

At step 506, in at least one of the various embodiments, the data coordinator may retrieve the relevant journal records from the L-nodes comprising the consensus group that may be managed by the data coordinator. At step 508, the collected journal records may be provided to the data controller.

At step 510, in at least one of the various embodiments, the data controller may receive the collected journal records. In at least one of the various embodiments, the data controller may generate the up-to-date current version of the data from the journal records. If an authoritative value for the requested data is computed, the data controller may communicate to the requesting client. At step 512, the client may receive the response to its request.

Figure 6:
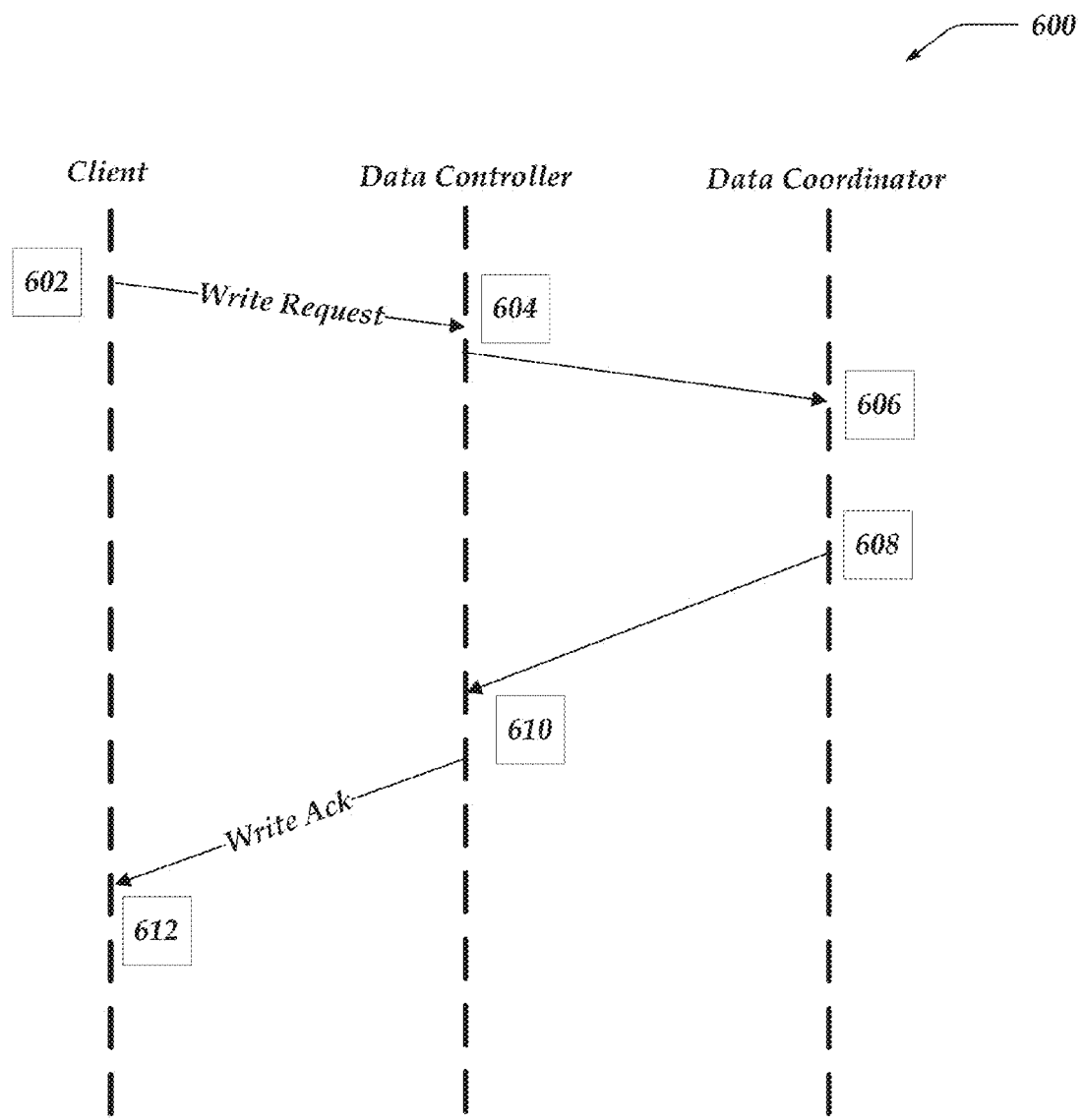
FIG. 6 illustrates an overview sequence diagram of a process for handling a write request from a client, in accordance with at least one of the various embodiments.

FIG. 6 illustrates an overview sequence diagram of process 600 for handling a write request from a client, in accordance with at least one of the various embodiments. At step 602, in at least one of the various embodiments, a client may request to write data to a storage system, such as, storage system 400 in FIG. 400. At step 604, in at least one of the various embodiments, the data controller may receive the write request that includes data for storing in the storage system. Accordingly, the data controller may parse the information included in the write request to determine the change information that should be stored in the persistent storage of the storage system. For example, if the storage system may be arranged to store key value pairs, the data controller may generate a journal record that includes the value and/or change in value that the client may be intending to store. The one or more journal records may be generated and communicated it to the data coordinator.

At step 606, in at least one of the various embodiments, the data coordinator may store the journal record information in the persistent storage of the storage system. Accordingly, the data coordinator may determine the relevant L-nodes where the journal records be stored. Further, in at least one of the various embodiments, the data coordinator may manage the execution of data protection schemes that may be employed. Also, in at least one of the various embodiments, the data coordinator may manage a consensus algorithm, if any, that may be employed.

At step 608, in at least one of the various embodiments, if the journal records are determined to be stored in the persistent data (e.g., stored on the L-nodes of the storage system) the data coordinator may communicate a write acknowledgement and/or write confirmation to the data controller.

At step 610, in at least one of the various embodiments, the data controller may receive the write acknowledgment and generate a write acknowledgement response that may be arranged to be response to the client. At step 612, the client may receive the write acknowledgement from the data controller.

Figure 7:
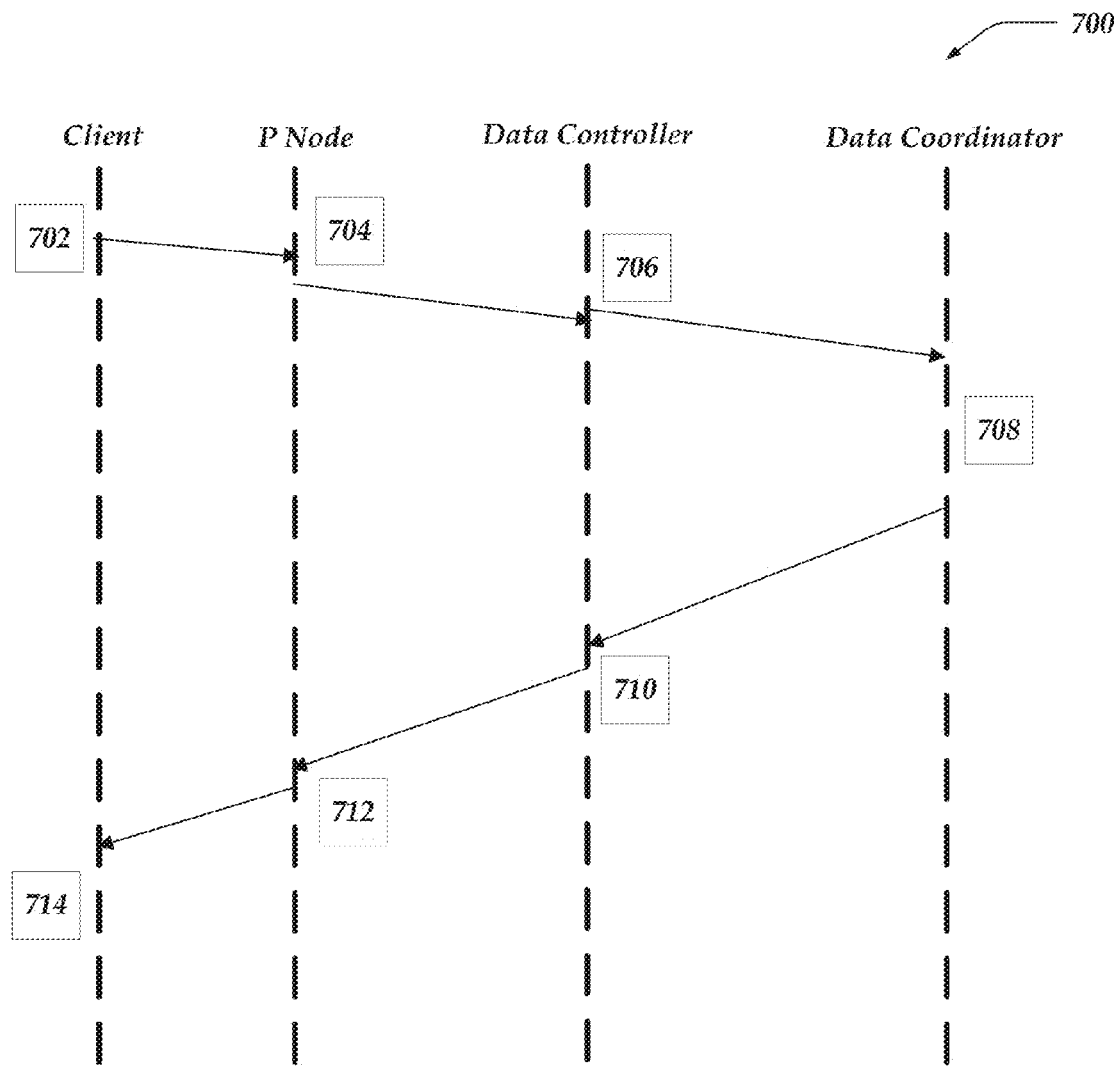
FIG. 7 illustrates an overview sequence diagram of a process for handling a communication of client and a non-data controller P-node, in accordance with at least one of the various embodiments.

FIG. 7 illustrates an overview sequence diagram of process 700 for handling a communication of client and a non-data controller P-node, in accordance with at least one of the various embodiments. In at least one of the various embodiments, a storage system, such as storage system 400 in FIG. 400 may include two or more P-nodes. In some cases, a client may be in communication with a P-node other than the P-node that is the elected data controller. At step 702, in at least one of the various embodiments, a client may communicate (read request or write data request) to a P-node. At step 704, the P-node that receives the communication may determine the data controller that it is associated with. Since the P-node acting as the data controller may have been selected by election and/or configuration, the P-node receiving the communication from the client may determine the P-node that is the data controller for the storage system. In at least one of the various embodiments, if a data controller is determined, the P-node may forward the communication to the data controller.

In at least one of the various embodiments, if the client is communicating a read request, the P-node may be arranged to attempt to read the request from its local cache. Accordingly, if read request may be resolved the P-node may refrain from communicating the request to the data controller and respond directly to the client.

At step 706, in at least one of the various embodiments, the data controller may forward the communication to the data coordinator of the L-nodes. At step 708, in at least one of the various embodiments, the data coordinator may process the request and communicate a response to the data controller.

At step 710, the data controller may generate a response based on the information included in the data coordinators responds and communicate it to the P-node the may be communicating with the client. At step 712, in at least one of the various embodiments, the P-node may communicate the response to the client. And, at step 714, the client may receive the response from the P-node and proceed accordingly.

Generalized Operation

FIGS. 8-11 represent the generalized operation for stateless processing of replicated state for distributed storage systems in accordance with at least one of the various embodiments. In at least one of the various embodiments, processes 800, 900, 1000, and 1100 described in conjunction with FIGS. 8-11 may be implemented by and/or executed on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computer, such as, those in a cloud-based environment. However, embodiments are not so limited and various combinations of network computers, client computers, or the like may be utilized. Further, in at least one of the various embodiments, the processes described in conjunction with FIGS. 8-11 may be operative in storage systems and/or architectures such as those described in conjunction with FIGS. 4-7.

Figure 8:
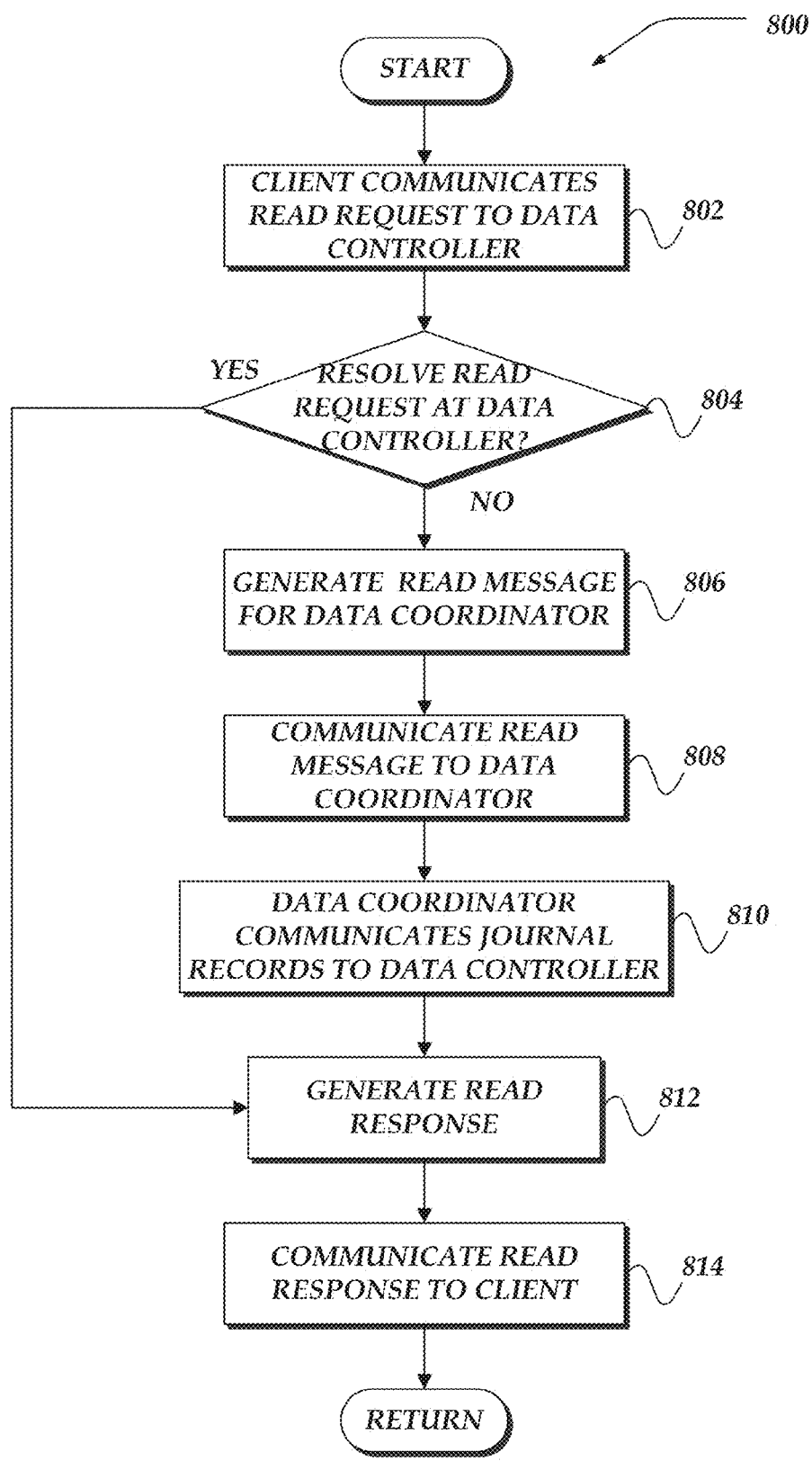
FIG. 8 shows an overview flowchart for a process for a stateless processing of replicated state for distributed storage systems in accordance with at least one of the various embodiments.

FIG. 8 shows an overview flowchart for process 800 for a stateless processing of replicated state for distributed storage systems in accordance with at least one of the various embodiments. After a start block, at block 802, in at least one of the various embodiments, a client may communicate a read request to a data controller of a storage system. In at least one of the various embodiments, the read request may be provided over a network. Also, in at least one of the various embodiments, the read request may be a request for file data, configuration information, database information, or the like, or combination thereof. In at least one of the various embodiments, the particular format of the read request may vary depending in the application that may be making the request and the type of data that may be requested. In at least one of the various embodiments, the read request may be performed by lower level system services such as a file system service, configuration service, or the like.

In at least one of the various embodiments, as discussed above, the data controller may be a P-node computer that has been elected and/or selected to be the data controller for the storage system. In at least one of the various embodiments, a P-node other than a data controller may be provided a read request from a client.

At decision block 804, in at least one of the various embodiments, if the read request may be resolved directly by the data controller, control may flow to block 812; otherwise, control may flow to block 806. Also, if a P-node other than the data controller is provided the read request that P-node may attempt to resolve the read request from its own local cache or forward the read request to its associated data controller. Accordingly, in at least one of the various embodiments, if the P-node is able to resolve the request control may flow to block 812 as well.

At block 806, in at least one of the various embodiments, the data controller may generate a read message for its associated data coordinator. In at least one of the various embodiments, the read message may be formulated to include a request for one or more journal records that may be stored in the storage system. Accordingly, in at least one of the various embodiments, the data controller may determine the one or more journal records that may be required to resolve the client's read request.

At block 808, in at least one of the various embodiments, the data controller may communicate the read message to its associated data controller. In at least one of the various embodiments, the read message may be communicated over a network to an L-node that is acting as a data coordinator. In at least one of the various embodiments, the data controller may determine the data controller based on configuration information that may be predefined. Also, in at least one of the various embodiments, the data controller may determine its associated data coordinator by one or more network broadcast/procedures upon coming online or if selected to become the data controller.

At block 810, in at least one of the various embodiments, the data coordinator may communicate one or more journal records that are responsive to the read message. If read message is provided by a data controller, the data coordinator may collect the requested one or more journal records from the L-nodes in the storage system.

In at least one of the various embodiments, the data coordinator may ensure that the journal records are restored to format that is readable/compatible with the data controller. For example, a storage system may employ one or more data protection/recovery schemes to provide fault tolerant storage at the L-nodes, such as erasure coding, If so, the data coordinator and/or its underlying file system services, may ensure that the journal records are provided whole and intact to the data controller.

At block 812, in at least one of the various embodiments, the data controller may generate a read response message that may be responsive to the client's read request. In at least one of the various embodiments, the data controller may be arranged to generate a response based on the current version of the data corresponding to the read request. Accordingly, in at least one of the various embodiments, the data controller may generate the current version of the data using the one or more journal records. In at least one of the various embodiments, the read response message may be arranged to include the current version of the data requested by the client.

At block 814, in at least one of the various embodiments, the data controller may communicate the read response message to the client that made the request. Next, control may be returned to a calling process.

Figure 9:
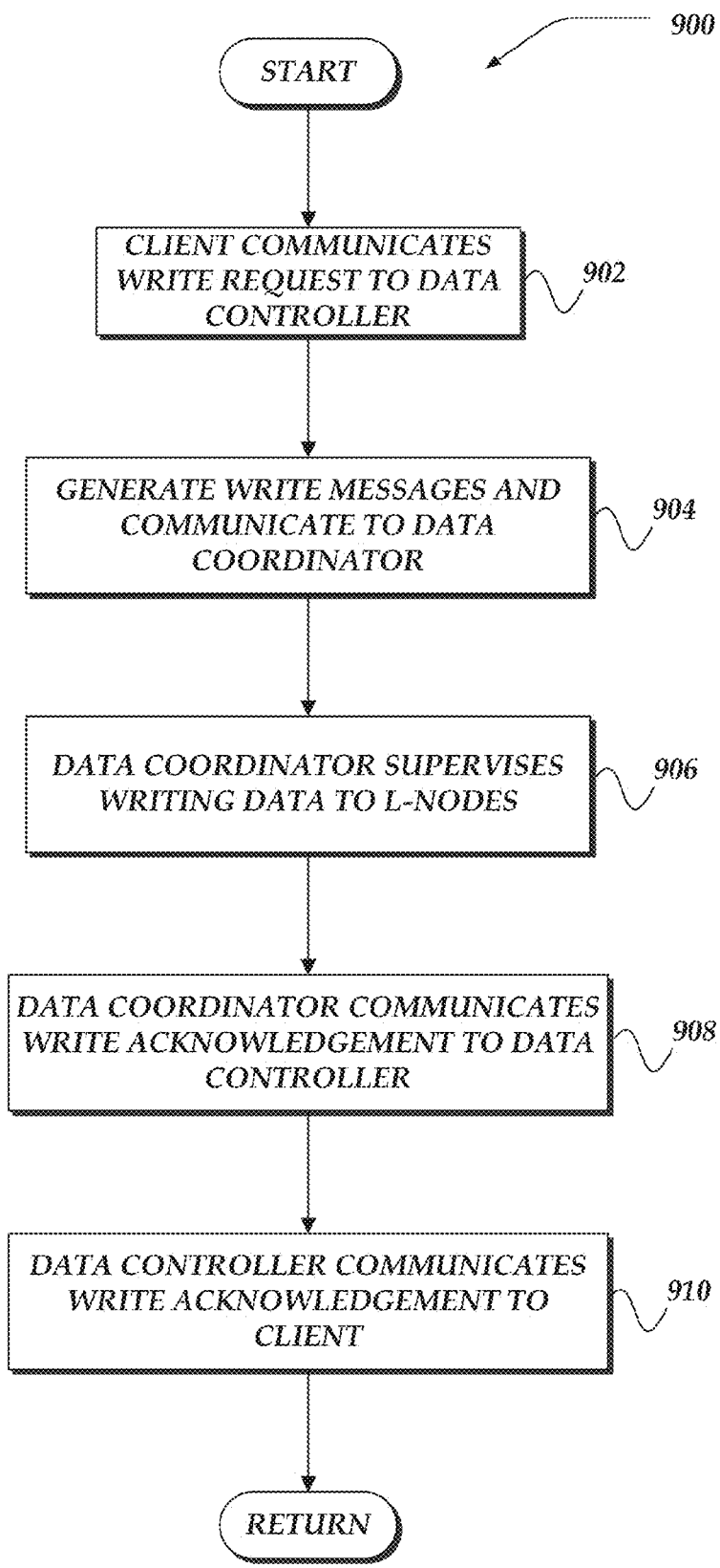
FIG. 9 shows an overview flowchart for a process for a stateless processing of replicated state for distributed storage systems in accordance with at least one of the various embodiments.

FIG. 9 shows an overview flowchart for process 900 for a stateless processing of replicated state for distributed storage systems in accordance with at least one of the various embodiments. After a start block, at block 902, in at least one of the various embodiments, a client may communicate a write request to a data controller of a storage system.

In at least one of the various embodiments, the write request may be provided over a network. Also, in at least one of the various embodiments, the write request may be a request to store file data, configuration information, database information, or the like, or combination thereof. In at least one of the various embodiments, the particular format of the write request may vary depending in the application that may be making the request and the type of data that may be requested. In at least one of the various embodiments, the write request may be performed by lower level system services such as a file system service, configuration service, or the like.

In at least one of the various embodiments, as discussed above, the data controller may be a P-node computer that has been elected and/or selected to be the data controller for the storage system. In at least one of the various embodiments, a P-node other than a data controller may be provided a write request from a client. Accordingly, the P-node may be arranged forward the write request to its associated data controller.

At block 904, in at least one of the various embodiments, the data controller may generate one or more write messages and communicate them to its associated data coordinator. In at least one of the various embodiments, the write message may comprise journal records that correspond to the write request provided by the client.

At block 906, in at least one of the various embodiments, the data coordinator may be provided the write message and coordinate/supervise the writing of the write message data to the stable storage of the L-nodes. In at least one of the various embodiments, the data coordinator may ensure that journal records included in the write message are safely stored on the L-node. For example, the data coordinator and the other L-nodes may employ one or more consensus algorithms to determine if a write message has been stored persistently in stable storage.

At block 908, in at least one of the various embodiments, if the data included in the write message is determined to be stored to stable storage, the data coordinator may provide a write acknowledgment message to the data controller. In at least one of the various embodiments, the write data is considered unsaved until the data controller is provided a write acknowledgment from the data coordinator.

At block 910, in at least one of the various embodiments, the data controller may provide a write acknowledgement to the client that initiated the write request. In at least one of the various embodiments, the data controller may generate a write acknowledgment message that may be compatible with the client the made the write request. Next, control may be returned to a calling process.

Figure 10:
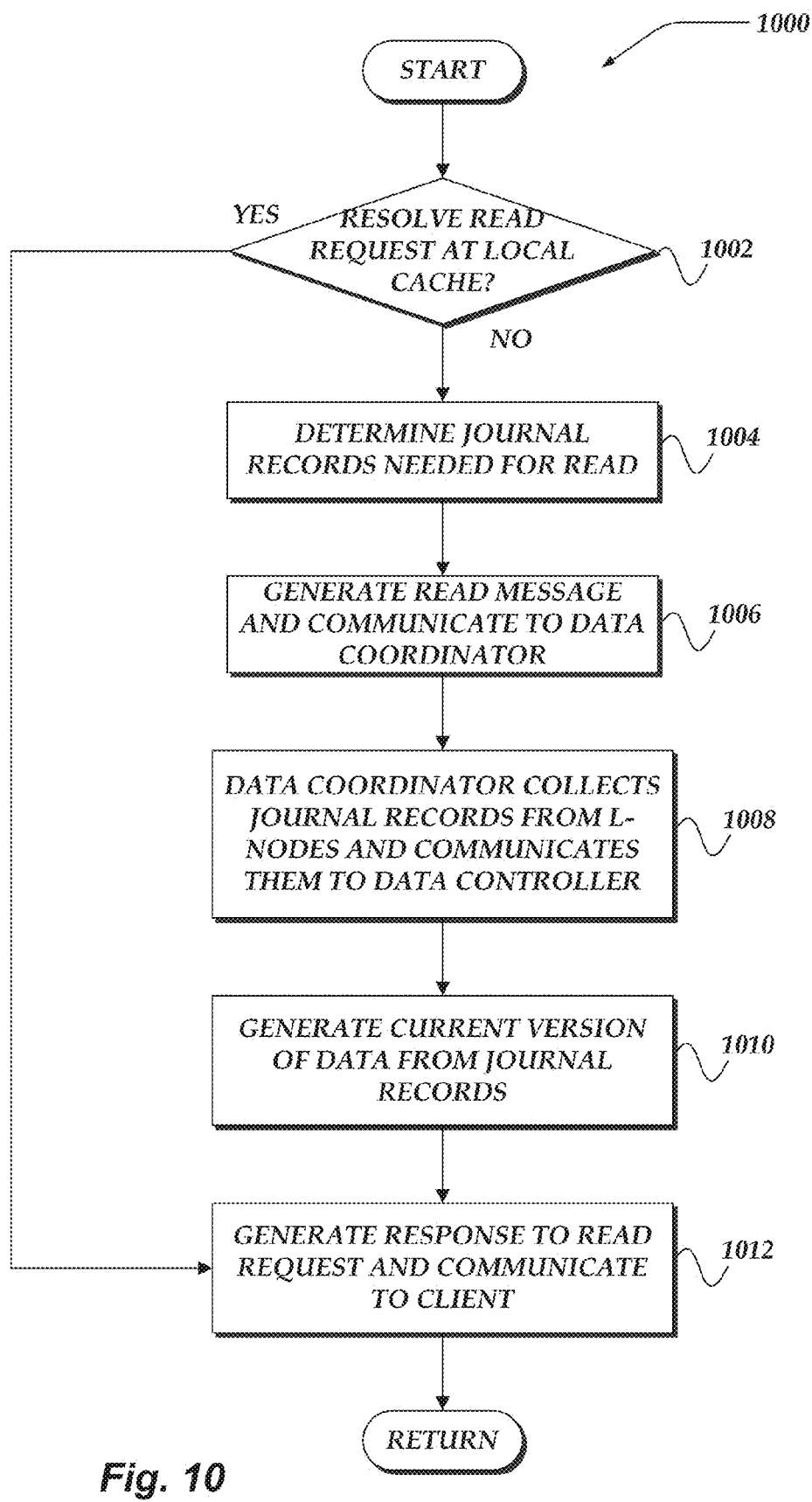
FIG. 10 shows a flowchart for a process for processing a read request in accordance with at least one of the various embodiments.

FIG. 10 shows a flowchart for process 1000 for processing a read request in accordance with at least one of the various embodiments. After a start block, at decision block 1002, in at least one of the various embodiments, if a read request may be resolved by the data controller using its local cache, control may flow to block 1012; otherwise, control may flow to block 1004.

In at least one of the various embodiments, a read request may be a request for the current value of a configuration value. Accordingly, if the current value is cached at the data controller, the data controller for resolve the read request without involving the data coordinator and/or the L=nodes.

In at least one of the various embodiments, the data controller may determine that its local copy of the requested data may be determined invalid based on various factors, such as, an expiration of a timer. For example, data that is over 24 hours old may be considered invalid. Also, in at least one of the various embodiments, the data may be unavailable in the local cache. Accordingly, the data may be stored in the L-nodes even though it is currently not in the local cache of the data controller.

At block 1004, in at least one of the various embodiments, the data controller may determine the journal records that may be needed for resolving the read request. In at least one of the various embodiments, as described above, the L-nodes have no visibility to the data content or the data context. In at least one of the various embodiments, L-nodes may be limited to storing journal records that record changes made to the data. In at least one of the various embodiments, each journal record may include the one or more changes to a particular data value that may have occurred in the transaction. Accordingly, in at least one of the various embodiments, to obtain a particular version of the data value, the journal records corresponding to the data for a determined period of time may be reviewed to the generate the correct data value.

In at least one of the various embodiments, to obtain the latest/current version of a data value (e.g., a configuration value, a data block, or the like) all of the journal records associated with the data of interest may be determined. For example, if the data controller does not have any definitive version of the data available it may determine that its needs to see all of the journal records for that data. In contrasts, if the data controller has a definitive previous version of the data, it only needs the journal records may have stored since the time of the previous version of the data. For example, if the last version of the data known to be current and correct is 4 hours old, just the journal records for the last four hours may be required.

At block 1006, in at least one of the various embodiments, the data controller may generate a read message and communicate it to its associated data coordinator. In at least one of the various embodiments, the read message may be formulated to include the data that may be required from the L-nodes. In at least one of the various embodiments, the read request may request one or more journal records, or a range of journal records from the L-nodes. In at least one of the various embodiments, additional meta-data such as timeouts, size limits, filters, or the like, or combination thereof, may be included in the request. In at least one of the various embodiments, the format of the read message may be generated to be compatible with the data coordinator it may be targeted at. Accordingly, it may be formatted using, XML, JSON, text, CSV, custom data formatting, or the like, or combination thereof.

In at least one of the various embodiments, if the read message is generated successfully, it may be communicated to the current data coordinator that is associated with the data controller. In at least one of the various embodiments, the message may be communicated over network, such as, network 108 and/or network 110, or the like.

At block 1008, in at least one of the various embodiments, the data coordinator collects journal records from the L-nodes and communicates them to the data controller. Upon being provided a read message, the data coordinator may unpack the request data information and retrieve it from the L-nodes. In at least one of the various embodiments, the data coordinator may fetch one or more journal records that have been requested by the data controller.

In at least one of the various embodiments, the L-nodes may be arranged as a distributed fault tolerant storage system. The particular arrangement of the L-nodes may vary depending on the policies of the storage system and its users. In some embodiments, the L-nodes may be arranged to provide one or more data protection levels for the stored data to protect against data failures. For example, the L-nodes may be arranged to employ one or more erasure encoding schemes to provide fault tolerant data protection.

At block 1010, in at least one of the various embodiments, the data controller may generate a current version of data from the journal records provided by the data coordinator. In at least one of the various embodiments, the data controller may process the journal records it is provided to generate a current version of the data. In at least one of the various embodiments, the data controller may generate the current version of the data by playing and/or replaying one or more actions that may be represented by the journal records.

In at least one of the various embodiments, the data controller may store the generated current version of the data in a cache memory to have available for subsequent read requests. In at least one of the various embodiments, the data controller may employ a last known version value of the data as a starting point to generate the current version of the data. Accordingly, if such a value is available, the data controller may just employ journal records that represent actions that have occurred since the starting point version of the data was generated.

In at least one of the various embodiments, the data controller may generate the current version of the data by replaying all of the available journal records that may be associated with the data.

At block 1012, in at least one of the various embodiments, the data controller may generate a response message and communicate it to the client the provided the read request. In at least one of the various embodiments, if the current version of the data is generated, the data controller may provide it to the requesting client. In at least one of the various embodiments, the format, protocol, data structure, or the like, of the message may be arranged to be compatible with the one or more applications employed by the client computer. Next, control may be returned to a calling process.

Figure 11:
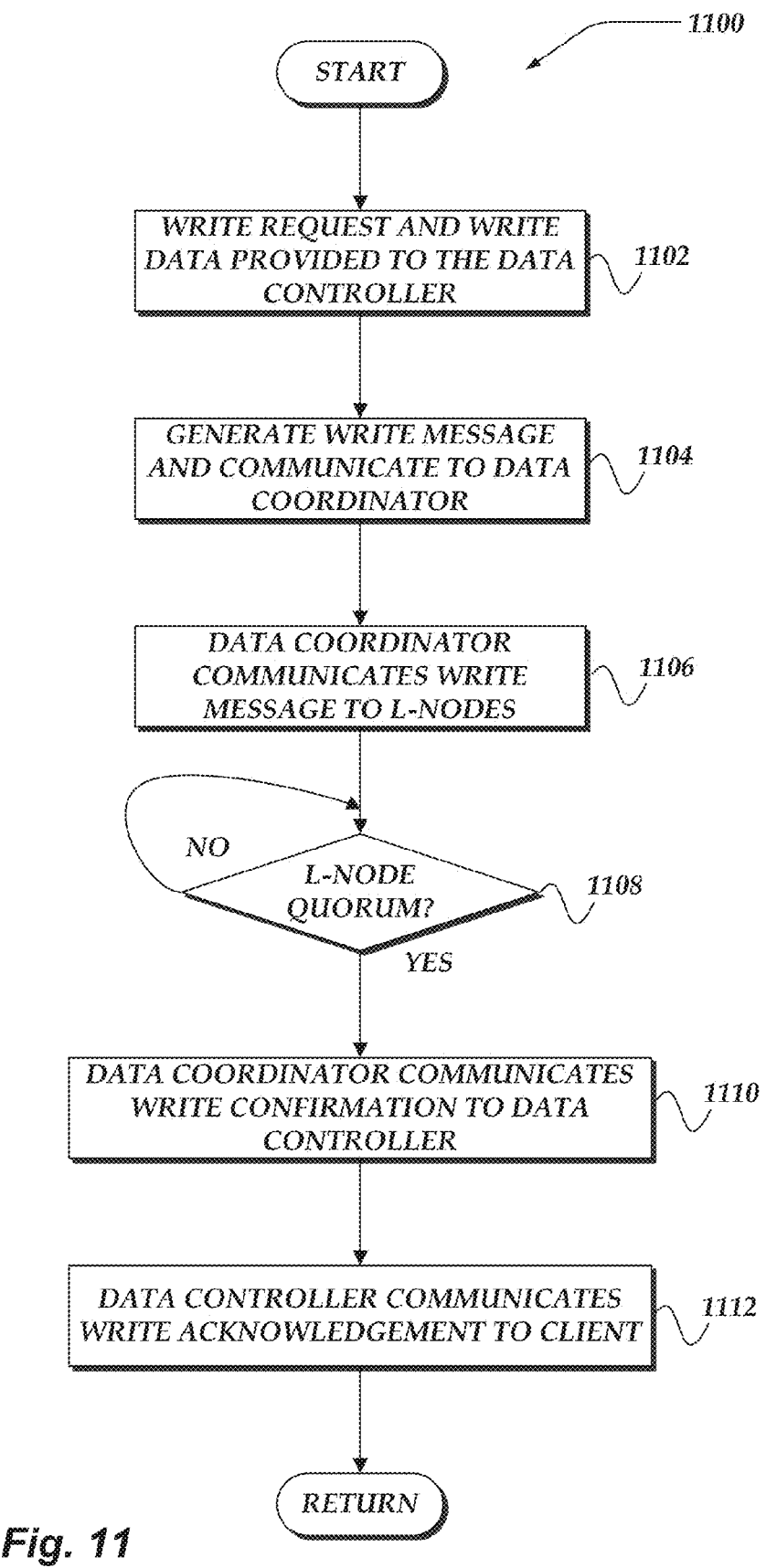
FIG. 11 shows a flowchart for a process for processing a write request in accordance with at least one of the various embodiments.

FIG. 11 shows a flowchart for process 1100 for processing a write request in accordance with at least one of the various embodiments. After a start block, at decision block 1102, in at least one of the various embodiments, a write request may be provided to a data controller for a storage system. In at least one of the various embodiments, the write request may include the data designated for writing. Or, in some embodiments, the write request may include information (e.g., address, name, unique identifiers, and so on) that enables the data controller to retrieve/locate the data that the client may be requesting to be written/saved to the storage system.

At block 1104, in at least one of the various embodiments, the data controller may generate a write message based on the write request provided by the client. The generated write message may be communicated to the data coordinator that is associated with the data controller. In at least one of the various embodiments, the write message may include an identifier of the data that is being saved.

In at least one of the various embodiments, the write message may include one or more journal records. Accordingly, the data controller may be arranged to generate the journal records from the write message provided by the client. The data controller may be arranged to convert application write messages into one or more journal records compatible with the L-nodes. This enables the data coordinator and the other L-nodes to operate absent the visibility of the application context.

At block 1106, in at least one of the various embodiments, the data coordinator may communicate the write message provided by the data controller to one or more L-nodes comprising the consensus group that may be supervised by the data coordinator. The data coordinator may initiate a consensus process as described above to determine if the incoming write information may be considered stored into persistent storage.

At decision block 1108, in at least one of the various embodiments, if a number of L-nodes confirm safe storage of the write data meets or exceeds a defined quorum value, control may flow to block 1110; otherwise, control may loop back to decision block 1108.

In at least one of the various embodiments, the minimum number of L-node confirmations required to determine a quorum may be defined using configuration information. In some embodiments, the quorum value may be determined on a per request basis. For example, a write message sent by a data controller may include a value that determines and/or influences the number of L-nodes confirmations required to obtain a consensus that the data is persistently stored. In some embodiments, the write message may include a value that indicates the relative importance of the write message. In such cases, the data coordinator may be arranged to adjust the quorum value based on the relative importance of the write message.

In at least one of the various embodiments, a timer may be set and/or monitored by the data coordinator. If the timer expires or otherwise exceeds a defined expiry value, the data coordinator may abort the write and provide an error message to the data controller indicating the write request failed. Accordingly, in at least one of the various embodiments, the data controller may respond to the client with an error message. In other embodiments, the data controller may be arranged to resend the write request to the data coordinator one or more times, depending on a how it may be configured.

At block 1110, in at least one of the various embodiments, the data coordinator may communicate a write confirmation to the data controller. Since, the data coordinator has received confirmations from enough L-nodes to meet or exceed the quorum value it may generate a conferment message and provide it to the data controller of the P-nodes. In at least one of the various embodiments, the data controller may update its local cache to reflect the successful storage of the write data associated with the write request.

At block 1112, in at least one of the various embodiments, the data controller may communicate a write acknowledgement to the client. In at least one of the various embodiments, since the data controller may be arranged to understand the context of the client write message, it may generate a write confirmation message that is arranged to be compatible with the client. For example, if the client message was in the form of a HTTP PUT request, the data controller may format the write confirmation message as a HTTP response message and provide it to the client.

In at least one of the various embodiments, if the client is communicating with another P-node rather than the data controller, the data controller P-node may forward the data coordinator write confirmation to the P-node that directly communication with the client the made the write request. Next, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitory storage media, or the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware systems which perform the specified actions or steps, or combinations of special purpose hardware and computer instructions.

What is claimed as new and desired to be protected by Letters Patent of the United States is:

1. The method for storing data in a storage system over a network using a network computer that performs actions, comprising:

employing a P-node to perform actions, including:

communicating with a client computer that provides a write request which includes write data;

generating one or more journal records that are converted, by the P-Node, from one or more write messages provided by one or more client computer applications, wherein the one or more journal records are provided to a plurality of L-nodes, and wherein content and client computer application context of the one or more journal records is opaque to the plurality of L-nodes;

generating a new write message that includes the write data and the one or more journal records;

communicating the new write message to one of the plurality of L-nodes that is elected by the plurality of L-nodes to be a data coordinator for the plurality of L-nodes; and employing the data coordinator to perform actions, including:
    communicating the new write message to each of the L-nodes, wherein each L-node communicates a write confirmation message to the data coordinator that indicates the write data and the one or more journal records are stored by each L-node; and
    when a predetermined amount of write confirmation messages indicate that the write data and the one or more journal records are stored, communicating a save confirmation message to the P-node; and
    employing the P-node to generate a write acknowledgement message that is responsive to the write request based on the save confirmation message, wherein the write acknowledgement message is communicated to the client computer.

2. The method of claim 1, comprising further actions:
employing another P-node to communicate with the client computer that provides the write request and write data; and
employing the other P-node to communicate the write request and the write data to the P-node.

3. The method of claim 1, wherein the plurality of L-nodes, further comprises, a persistent, fault tolerant data store.

4. The method of claim 1, wherein the P-node is elected to be a data controller by a plurality of L-nodes.

5. The method of claim 1, further comprising:
generating the one or more journal records based on the write request and the write data; and
including the one or more journal records in the new write message.

6. The method of claim 1, wherein the P-node includes a local cache memory that stores the write data without employing a persistent data store.

7. The method of claim 1, further comprising:
obtaining a read request from the client computer;
when a data value corresponding to the read request is unavailable from a local cache memory of the P-node, forwarding the read request to the data coordinator to obtain one or more journal records associated with the data value; and
generating a read response based on the one or more journal records.

8. The method of claim 1, wherein the predetermined amount of write confirmation messages is based on at least an execution of a consensus algorithm by the data coordinator and the plurality of L-nodes.

9. A system for storing data in a storage system over a network, comprising:
a P-node computer, comprising:
a transceiver that communicates over the network;
a memory that stores at least instructions; and
a processor device that executes instructions that perform actions, including:
    communicating with a client computer that provides a write request which includes write data;
    generating one or more journal records that are converted, by the P-Node, from one or more write messages provided by one or more client computer applications, wherein the one or more journal records are provided to a plurality of L-nodes, and wherein content and client computer application context of the one or more journal records is opaque to the plurality of L-nodes;
    generating a new write message that includes the write data and the one or more journal records;
    communicating the new write message to one of the plurality of L-nodes that is elected by the plurality of L-nodes to be a data coordinator for the plurality of L-nodes; and
the data coordinator computer, comprising:
a transceiver that communicates over the network;
a memory that stores at least instructions; and
a processor device that executes instructions that perform actions, including:
    communicating the new write message to each of the L-nodes, wherein each L-node communicates a write confirmation message to the data coordinator that indicates the write data and the one or more journal records are stored by each L-node; and
    when a predetermined amount of write confirmation messages indicate that the write data and the one or more journal records are stored, communicating a save confirmation message to the P-node computer; and
    employing the P-node computer to generate a write acknowledgement message that is responsive to the write request based on the save confirmation message, wherein the write acknowledgement message is communicated to the client computer.

10. The system of claim 9, comprising further actions:
employing another P-node to communicate with the client computer that provides the write request and write data; and
employing the other P-node to communicate the write request and the write data to the P-node computer.

11. The system of claim 9, wherein the plurality of L-nodes, further comprises, a persistent, fault tolerant data store.

12. The system of claim 9, wherein the P-node computer is elected to be a data controller by a plurality of L-nodes.

13. The system of claim 9, wherein the P-node computer processor device executes instructions that perform further actions, comprising:
generating the one or more journal records based on the write request and the write data; and
including the one or more journal records in the new write message.

14. The system of claim 9, wherein the P-node computer includes a local cache memory that stores the write data without employing a persistent data store.

15. The system of claim 9, wherein the P-node computer processor device executes instructions that perform further actions, comprising:
obtaining a read request from the client computer;
when a data value corresponding to the read request is unavailable from a local cache memory of the P-node computer, forwarding the read request to the data coordinator computer to obtain one or more journal records associated with the data value; and
generating a read response based on the one or more journal records.

16. The system of claim 9, wherein the predetermined amount of write confirmation messages is based on at least an execution of a consensus algorithm by the data coordinator computer and the plurality of L-node computers.

17. A processor readable non-transitory storage media that includes instructions for storing data in a storage system over a network, wherein execution of the instructions by a processor device performs actions, comprising:
employing a P-node to perform actions, including:
    communicating with a client computer that provides a write request which includes write data;

generating one or more journal records that are converted, by the P-Node, from one or more write messages provided by one or more client computer applications, wherein the one or more journal records are provided to a plurality of L-nodes, and wherein content and client computer application context of the one or more journal records is opaque to the plurality of L-nodes;

generating a new write message that includes the write data and the one or more journal records;

communicating the new write message to one of the plurality of L-nodes that is elected by the plurality of L-nodes to be a data coordinator for the plurality of L-nodes; and employing the data coordinator to perform actions, including:

communicating the new write message to each of the L-nodes, wherein each L-node communicates a write confirmation message to the data coordinator that indicates the write data and the one or more journal records are stored by each L-node; and when a predetermined amount of write confirmation messages indicate that the write data and the one or more journal records are stored, communicating a save confirmation message to the P-node; and employing the P-node to generate a write acknowledgement message that is responsive to the write request based on the save confirmation message, wherein the write acknowledgement message is communicated to the client computer.

18. The media of claim 17, comprising further actions:
employing another P-node to communicate with the client computer that provides the write request and write data; and
employing the other P-node to communicate the write request and the write data to the P-node.

19. The media of claim 17, wherein the plurality of L-nodes, further comprises, a persistent, fault tolerant data store.

20. The media of claim 17, wherein the P-node is elected to be a data controller by a plurality of L-nodes.

21. The media of claim 17, further comprising:
generating the one or more journal records based on the write request and the write data; and
including the one or more journal records in the new write message.

22. The media of claim 17, wherein the P-node includes a local cache memory that stores the write data without employing a persistent data store.

23. The media of claim 17, further comprising:
obtaining a read request from the client computer;
when a data value corresponding to the read request is unavailable from a local cache memory of the P-node, forwarding the read request to the data coordinator to obtain one or more journal records associated with the data value; and
generating a read response based on the one or more journal records.

24. A network computer that is operative for storing data in a storage system over a network using a network, comprising:
a transceiver that communicates over a network;
a memory that stores at least instructions; and
a processor device that executes instructions that perform actions, including:

employing a P-node to perform actions, including:
communicating with a client computer that provides a write request which includes write data;
generating one or more journal records that are converted, by the P-Node, from one or more write messages provided by one or more client computer applications, wherein the one or more journal records are provided to a plurality of L-nodes, and wherein content and client computer application context of the one or more journal records is opaque to the plurality of L-nodes;
generating a new write message that includes the write data and the one or more journal records;
communicating the new write message to one of the plurality of L-nodes that is elected by the plurality of L-nodes to be a data coordinator for the plurality of L-nodes; and
employing the data coordinator to perform actions, including:
communicating the new write message to each of the L-nodes, wherein each L-node communicates a write confirmation message to the data coordinator that indicates the write data and the one or more journal records are stored by each L-node; and
when a predetermined amount of write confirmation messages indicate that the write data and the one or more journal records are stored, communicating a save confirmation message to the P-node; and
employing the P-node to generate a write acknowledgement message that is responsive to the write request based on the save confirmation message, wherein the write acknowledgement message is communicated to the client computer.

25. The network computer of claim 24, comprising further actions:
employing another P-node to communicate with the client computer that provides the write request and write data; and
employing the other P-node to communicate the write request and the write data to the P-node.

26. The network computer of claim 24, wherein the plurality of L-nodes, further comprises, a persistent, fault tolerant data store.

27. The network computer of claim 24, wherein the P-node is elected to be a data controller by a plurality of L-nodes.

28. The network computer of claim 24, wherein the processor device executes instructions that perform further actions, comprising:
generating the one or more journal records based on the write request and the write data; and
including the one or more journal records in the new write message.

29. The network computer of claim 24, wherein the P-node includes a local cache memory that stores the write data without employing a persistent data store.

30. The network computer of claim 24, wherein the processor device executes instructions that perform further actions, comprising:
obtaining a read request from the client computer;
when a data value corresponding to the read request is unavailable from a local cache memory of the P-node, forwarding the read request to the data coordinator to obtain one or more journal records associated with the data value; and
generating a read response based on the one or more journal records.

* * * * *